United States Patent [19]

Bower

[11] 4,095,415

[45] Jun. 20, 1978

[54] EXPANDABLE METAL BELT

[76] Inventor: Richard R. Bower, 3708 Crownridge Dr., Sherman Oaks, Calif. 91403

[21] Appl. No.: 750,604

[22] Filed: Dec. 15, 1976

[51] Int. Cl.² .............................................. F16G 13/24
[52] U.S. Cl. .................................... 59/35 R; 2/338; 59/79 A; 59/80; 59/83
[58] Field of Search ............ 59/35, 80, 79 A, 78, 59/82, 83; 2/338, 339, 323, 324; 63/5 A, 2, 3, 4

[56] References Cited

U.S. PATENT DOCUMENTS

| 973,601 | 10/1910 | Widenmeyer | 59/79 A |
|---|---|---|---|
| 1,784,239 | 12/1930 | Lederer | 63/3 |
| 3,886,727 | 6/1975 | Bower | 59/79 B |

FOREIGN PATENT DOCUMENTS

| 270,428 | 1/1930 | Italy | 63/2 |

*Primary Examiner*—Carl E. Hall
*Assistant Examiner*—Gene P. Crosby
*Attorney, Agent, or Firm*—Christie, Parker & Hale

[57] ABSTRACT

An expandable metal belt is formed from a plurality of figure-8 shaped sections linked together, each section being formed by weaving a tubular-shaped mesh section from spring metal wire. A coiled wire tensioned spring is passed through the center of the tubular shaped mesh and the ends of the spring are secured to the ends of the tubular mesh section. The opposite ends of the mesh section and tension spring are looped around and brought into abutting relationship and positioned in adjacent parallel relationship to the center of the mesh section to form two loops in the shape of a figure-8. The abutting ends and adjacent center of the mesh are then clamped together by bending a thin metal piece tightly around the adjacent portions of the tubular-shaped mesh section.

9 Claims, 9 Drawing Figures

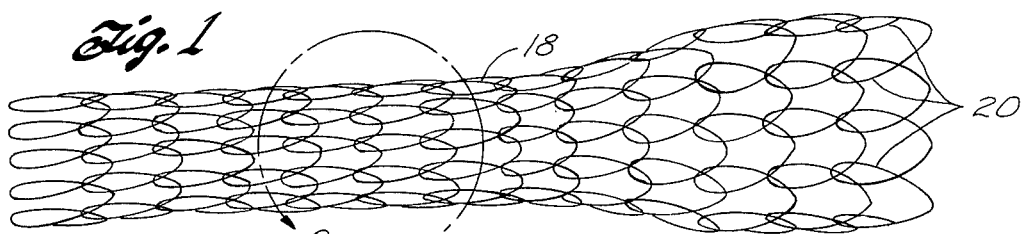
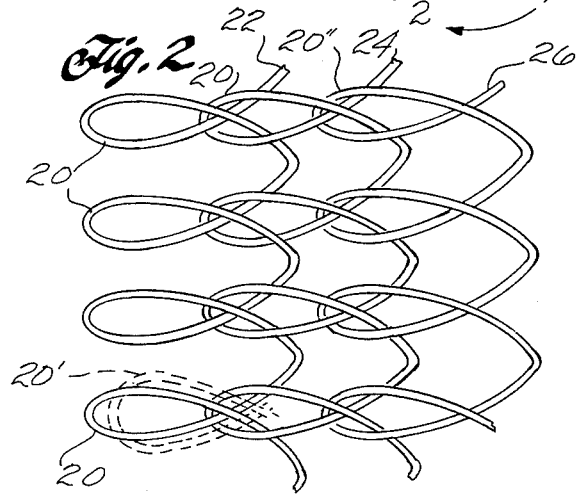
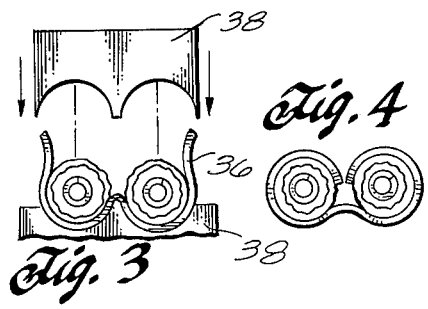
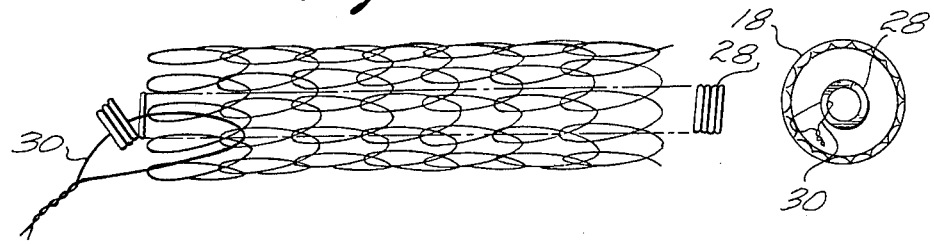
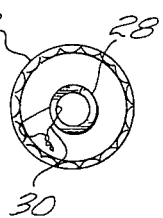
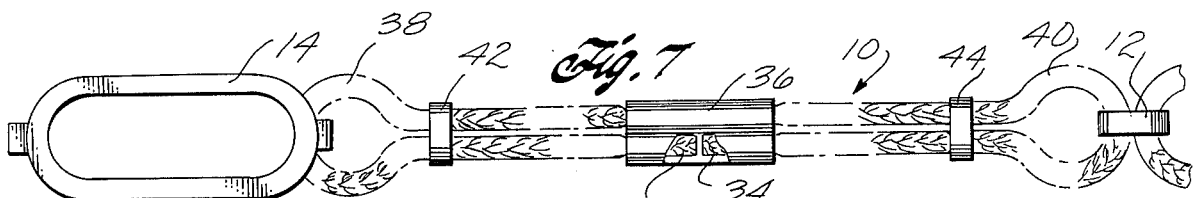
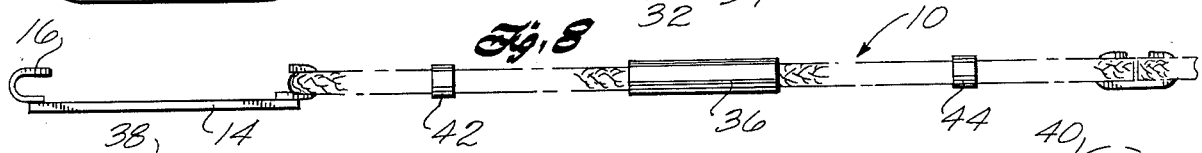
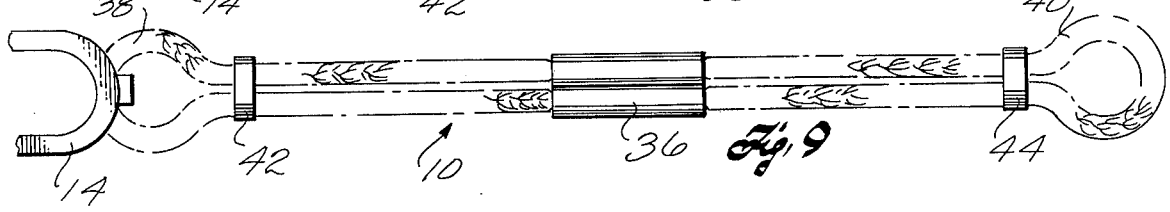

4,095,415

EXPANDABLE METAL BELT

FIELD OF THE INVENTION

This invention relates to expandable belts, and particularly to a belt of the type worn around the waist.

BACKGROUND

Expandable metal belts or bands have heretofore been proposed which combine utility with the rich appearance that only metal can provide. One such expandable metal belt is described in my U.S. Pat. No. 3,886,727. Known types of expandable metal belts, by the nature of their construction, the quantity of materials used, and the complexity of manufacture, result in a much more expensive article than belts of a more conventional non-expanding design.

SUMMARY OF THE INVENTION

The present invention is directed to an improved design for and a method of manufacture of an expandable metal belt which is both pleasing in appearance and relatively inexpensive to manufacture.

In brief, the present invention provides a belt which is made up of a plurality of individual sections, each section comprising two loops joined at the center in the form of a figure-8. The individual sections are constructed by weaving a tubular-shaped mesh section from spring metal wire with the weave being formed with interlocking loops. The loops are elongated to permit the interlocking loops to move relative to each other so that the length of the mesh section can be expanded and contracted longitudinally. A tension spring passes through the center of the tubular shaped mesh section and the ends are secured to the ends of the mesh section. The opposite ends of the mesh section with the tension spring inside are then formed into two loops by bringing the ends together in abutting relationship adjacent the center of the section. A thin metal piece is then tightly wrapped around the abutting ends and the parallel central portion of the mesh section to clamp the ends together and secure the mesh section in the form of two elongated closed loops.

DESCRIPTION OF THE DRAWINGS

For a more complete understanding of the invention reference should be made to the accompanying drawing, wherein:

FIG. 1 shows a portion of the longitudinal section of a tubular shaped woven wire section;

FIG. 2 is an enlarged portion of the woven wire section;

FIG. 3 shows the manner in which the woven section is clamped by a metal clip into two loops forming a figure-8;

FIG. 4 is a sectional view showing the clip after it is formed;

FIG. 5 is a view showing the manner in which the central spring is attached to the woven wire section;

FIG. 6 is an end view showing the tubular shape of the woven wire section;

FIG. 7 shows a fully assembled belt; and

FIG. 8 is a side view of the assembled belt.

FIG. 9 shows a belt section in an extended position.

DETAILED DESCRIPTION OF THE DRAWINGS

Referring to FIGS. 7 and 8 in detail, the numeral 10 indicates generally an assembled belt section, a plurality of which may be linked together in a chain, as by means of connecting links 12 to form a completed belt. The belt is provided with a buckle 14 which may take a variety of decorative forms and which includes a U-shaped clasp 16 that may be hooked around the end belt section to fasten the belt in a closed loop.

Referring to FIGS. 1-5, the manner in which the individual belt sections 10 are constructed is shown in detail. An outer section of tubular-shaped mesh 18 is woven from a spring metal wire by known knitting or crocheting techniques. The wire, which is made of a fairly hard flexible springy material is woven by forming the wire into a plurality of closed loops 20. The succession of loops are formed in a helix with the loops in the successive turns of the helix extending through the loops of the adjacent turn of the helix in interlocking relationship. Thus, as shown in FIG. 2, the wire loops of three successive turns of the helix are shown at 22, 24 and 26 respectively. The loops 20 formed in the helical turn 22 project through the adjacent loops 20' of the helical turn 24. Similarly, the loops 20' of the helical turn 24 extend through the loop 20" of the helical turn 26. Because the looped wire is arranged in helix, the resulting woven structure is tubular in shape. The tubular shaped woven wire material is run through compressive rollers or the like to reduce its diameter. As a result, the loops 20 are bent into a more elongated shape, as shown at the left-hand end in FIG. 1 or in FIG. 5. The elongated shape of the loop allows the woven section to be compressed or stretched longitudinally as the loops in each turn of the helix slide longitudinally along the length of the interlocking loops of the next turn. In FIG. 2, the dotted line for the loop 20' relative to the loop 20 shows the relative position of the loops when the woven material is longitudinally compressed. Thus, the pitch of each helical turn can be extended or shortened by a factor as much as 2:1 with a corresponding change in overall length of the section of woven wire mesh.

The woven wire outer section 18 is cut to the desired length and a tightly wound wire tension spring 20 is passed through the center of the tubular section, as shown in FIG. 5. One end of the spring 28 is joined to the associated end of the outer woven section by passing an anchoring wire 30 through several of the loops 20 and through several turns at the end of the tension spring 28, as indicated at 30. The ends of the anchoring wire 30 are twisted together after the wire is threaded in place. The other end of the spring 28 is joined to the outer woven section 18 in the same fashion after the woven section is fully compressed and the inner spring 28 is placed under slight tension. Thus, the outer woven section is held in compression by the tension of the inner coil tension spring 28. The spring 28 is sufficiently stiff so that it holds its straight shape longitudinally.

With the tension spring 28 in place, the ends of the outer woven section 18 are looped into abutting relationship, as indicated in FIG. 7. The abutting ends are then clamped in alignment with each other and also clamped to the center portion of the section 18 by a metal clip 36. The metal clip 36 is formed of a thin piece of metal which is initially formed in an open substantially U-shape, as shown in FIG. 3. After the end 32 and 34 and center portion of the woven wire section are placed in position in the open clip, the ends of the metal clip 36 are crimped around the woven wire section by a forming tool 38 which is placed in a press and under pressure forms the metal clip into the double tubular clamping configuration shown in FIG. 4. Before the clamping operation, the retaining wires 30 at the two ends of the woven wire section 18 are preferably twisted together to lock the abutting end 32 and 34 together.

As shown in FIG. 7, with the clip 36 pressed and formed into clamping condition, the woven wire section 18 with its internal tension spring 28 provides two closed loops 38 and 40, substantially in the shape of a figure-8. A pair of clips 42 and 44 are preferably attached at points spaced from the central clip 36 on either side to form the closed loops into the desired elongated belt-shape.

The tension spring 28 normally maintains the outer woven wire section in its shortened compressed state.

When the belt is stretched by applying tension, the inner tension spring 28 becomes stretched and the outer woven wire section becomes extended. When released, the tension spring 28 compresses the woven section back to its original length. The result is that the belt, as constructed, holds it shape and yet is flexible and expandable under tension, returning to its initial shape whenever the tension is removed. Being made entirely of metal, it can be plated to provide a rich lusterous finish, and it maintains its utility and appearance almost indefinitely.

I claim:

1. The method of constructing an expandable belt or the like comprising the steps of: weaving a tubular-shaped mesh section from metal wire, passing tension spring through the center of the tubular mesh section, securing the ends of spring to respective ends of the tubular mesh section with the mesh longitudinally fully compressed, bringing the opposite ends of the mesh section together in abutting relationship, clamping the abutting ends together and in side-by-side relationship to the center of the section of tubular mesh to provide a pair of closed loops in the form of a figure-8.

2. The method of claim 1 further including the step of joining two or more of said figure-8 sections together at the bight ends of the respective closed loops to form an elongated chain of such figure-8 shaped mesh sections.

3. The method of claim 2 wherein the clamping is provided by bending the thin metal piece tightly around the abutting ends and parallel central portion of the section of mesh.

4. An expandable metal belt or the like comprising an outer section of woven wire tubular shaped mesh of expandable length, an inner tension spring extending through the center of the tubular outer mesh, means joining the ends of the tension spring to the ends of the section of tubular mesh, the tension of the inner spring normally maintaining the mesh at a compressed length, a central clip having a pair of parallel tubular openings, the center of the section of outer mesh extending through and being clamped in one of said tubular openings and the two ends of the section of outer mesh extending into and being clamped in the other tubular opening in abutting relationship, whereby the section of outer mesh is formed into two closed loops extending on either side of the clip.

5. The expandable metal belt of claim 4 further including a pair of additional clips extending around the outer mesh of the two loops at spaced distances from the central clip to form the loops into elongated parallel intermediate regions between the two clips and the central clip.

6. The expandable metal belt of claim 4 wherein said mesh section is woven from a resilient springy wire that resists permanent deformation.

7. The expandable metal belt of claim 4 wherein the tension spring is a tightly coiled wire spring that tends to return to a straight elongated position when bent.

8. The expandable metal belt of claim 4 wherein the central clip is made of thin metal folded tightly around the outside of the adjacent portions of the tubular-shaped mesh.

9. The expandable metal belt of claim 4 wherein the section of mesh is woven with interlocking loops, the wire loops being elongated in the lengthwise direction of the section.

* * * * *